(12) United States Patent
Troesch (10) Patent No.: US 10,389,729 B2
(45) Date of Patent: Aug. 20, 2019

(54) ACCESS CONTROL USING PORTABLE ELECTRONIC DEVICES

(71) Applicant: Inventio AG, Hergiswil NW (CH)

(72) Inventor: Florian Troesch, Erlenbach (CH)

(73) Assignee: INVENTIO AG, Hergiswil (CH)

( * ) Notice: Subject to any disclaimer, the term of this patent is extended or adjusted under 35 U.S.C. 154(b) by 131 days.

(21) Appl. No.: 15/025,913

(22) PCT Filed: Sep. 29, 2014

(86) PCT No.: PCT/EP2014/070726
§ 371 (c)(1),
(2) Date: Mar. 30, 2016

(87) PCT Pub. No.: WO2015/049187
PCT Pub. Date: Apr. 9, 2015

(65) Prior Publication Data
US 2016/0248782 A1   Aug. 25, 2016

(30) Foreign Application Priority Data
Oct. 1, 2013 (EP) ..................................... 13186976

(51) Int. Cl.
*H04L 29/06* (2006.01)
*G07C 9/00* (2006.01)
(52) U.S. Cl.
CPC ........ *H04L 63/107* (2013.01); *G07C 9/00007* (2013.01); *G07C 9/00103* (2013.01); *H04L 63/108* (2013.01); *G07C 9/00015* (2013.01)

(58) Field of Classification Search
CPC ........................... G06F 21/36; G07C 9/00309
See application file for complete search history.

(56) References Cited

U.S. PATENT DOCUMENTS

| | | | |
|---|---|---|---|
| 6,987,975 B1 * | 1/2006 | Irvin | H04W 4/02 455/41.2 |
| 7,982,601 B2 | 7/2011 | Corrado et al. | |
| 2009/0324025 A1 | 12/2009 | Camp, Jr. et al. | |
| 2011/0291798 A1 | 12/2011 | Schibuk | |
| 2012/0068818 A1 * | 3/2012 | Mizon | G07C 9/00007 340/5.61 |
| 2012/0249290 A1 * | 10/2012 | Marsh | H04M 11/025 340/5.7 |
| 2013/0210406 A1 | 8/2013 | Vidal et al. | |

FOREIGN PATENT DOCUMENTS

| | | | |
|---|---|---|---|
| CN | 102138290 A | 7/2011 | |
| WO | 03049042 A1 | 6/2003 | |
| WO | WO-2007097601 A1 * | 8/2007 | ............. H04L 63/08 |
| WO | 2008042597 A2 | 4/2008 | |

* cited by examiner

*Primary Examiner* — Jason K Gee
(74) *Attorney, Agent, or Firm* — William J. Clemens; Shumaker, Loop & Kendrick, LLP (57) ABSTRACT

An access control system is configured to detect the presence of a portable electronic device carried by a user in a first area. The access control system sends an access code to the device. In a second area, the user presents the portable electronic device to an access terminal, which reads the access code from the device. If the access code read from the device matches the access code that was sent to the device by the system, then the access control system grants access to the user.

14 Claims, 7 Drawing Sheets

FIG. 7

ACCESS CONTROL USING PORTABLE ELECTRONIC DEVICES

FIELD

This disclosure relates to access control systems.

BACKGROUND

Access control systems typically require a user to present to the system something that is intended to serve as evidence that the user is authorized to receive access from the system. For example, some systems grant access to a user based on a token (e.g., an identification card or a key fob) in the user's possession. The token can be an RFID (radio-frequency identification) tag or other information-storage device. In other systems, access is granted to a user based on information that the user provides to the system, such as a password. Some systems require multiple items from a user, for example, both a token and a password.

US20110291798A1 describes a system in which an electronic device, such as a smartphone, stores a digitally signed physical access rights file. An individual uses this rights file to gain access to a restricted area only after self-authenticating to the device. A physical access control system receives the rights file, validates it, and determines whether to permit passage through a physical barrier. An access control gateway may transmit an authorization code to the electronic device and the physical barrier system, whereby passage is only permitted if the barrier system subsequently receives the authorization code from the electronic device using near field communications.

SUMMARY

Further options for access control systems could be advantageous.

An access control system can be configured to detect the presence of a portable electronic device carried by a user in a first area. The access control system sends an access code to the device. In a second area, the user presents the portable electronic device to an access terminal, which reads the access code from the device. If the access code read from the device matches the access code that was sent to the device by the system, then the access control system grants access to the user.

In some embodiments, a method comprises: determining a first device identifier for a portable electronic device of a user, the determining being performed in response to the portable electronic device entering a first area; as a result of determining the first device identifier from the portable electronic device, sending an access code to the portable electronic device based on a second device identifier for the portable electronic device, the second device identifier having been determined based on the first device identifier; reading the access code from the portable electronic device at a second area using an access terminal; and granting access to the user as a result of reading the access code from the portable electronic device. In some cases, the portable electronic device is in a locked state when the first device identifier is determined for the device and when the access code is sent to the device, and the portable electronic device is in an unlocked state when the access code is read from the device using the access terminal. In further embodiments, the second area is a higher-security area, the method further comprising: reading the access code from the portable electronic device at a third area using another access terminal while the device is in a locked state, the third area being a lower-security area and being within the second area; and granting the user access to the third area. The first device identifier is for a first communications channel and the second device identifier is for a second communications channel. The sending the access code to the portable electronic device comprises sending user information to the portable electronic device. The first device identifier can be obtained using a radio signal from the portable electronic device, or the access code being read from the portable electronic device using a radio signal from the portable electronic device. In some cases, the access terminal reads the access code from the portable electronic device using an optical sensor, the access code comprising an optical code. The access code can have a limited validity time. The validity time of the access code can be based on an expected travel time for the user from the first area to the second area, on a distance between the first area and the second area, or on a security level for the area. The method can further comprise determining, using the access terminal, that an access control program is running on the portable electronic device. The determining the first device identifier can comprise receiving, using a sensor, a periodically transmitted device identifier from the portable electronic device. In some cases, the first device identifier is determined to be the periodically transmitted device identifier, or the periodically transmitted device identifier is used to create a communication connection with the portable electronic device, the first device identifier being read from the device through the communication connection. This can further comprise further determining if the periodically transmitted device identifier is a known periodically transmitted device identifier. The method can further comprise reading a certificate or a user identification from the portable electronic device using the access terminal, the granting access to the user being further based on the certificate or the user identification.

Some embodiments of a system comprise: a sensor; an access terminal; a wireless communication network; a database; and a computer-based control unit coupled to the sensor, the access terminal, the wireless communication network, and the database, the control unit comprising a processor and a computer-readable storage medium, the computer-readable storage medium comprising instructions that cause the processor to determine a first device identifier for a portable electronic device of a user using the sensor, the determining being performed in response to the portable electronic device entering a first area, as a result of determining the first device identifier from the portable electronic device, send an access code to the portable electronic device based on a second device identifier for the portable electronic device, the second device identifier having been determined based on the first device identifier, read the access code from the portable electronic device using the access terminal, the access terminal being in a second area, and grant access to the user as a result of reading the access code from the portable electronic device.

Further method embodiments comprise: bringing a portable electronic device within range of a sensor for a first area, such that the sensor can determine a first device identifier for the portable electronic device; receiving an access code with the portable electronic device as a result of the bringing the device within the range of the sensor, the access code being sent to the device using a second device identifier for the device, the second device identifier having been determined based on the first device identifier; presenting the portable electronic device at an access terminal at a second area, the access terminal being programmed to read the access code from the portable electronic device; and being granted access as a result of the presenting the portable electronic device at the access terminal. The method can further comprise receiving an indication from the portable electronic device that the device has received the access code.

Further embodiments comprise a computer-based device configured to perform one or more of the disclosed methods.

At least some embodiments of the disclosed methods can be implemented using a computer or computer-based device that performs one or more method acts, the computer or computer-based device having read instructions for performing the method acts from one or more computer-readable storage media. The computer-readable storage media can comprise, for example, one or more of optical disks, volatile memory components (such as DRAM or SRAM), or non-volatile memory components (such as hard drives, Flash RAM or ROM). The computer-readable storage media do not cover pure transitory signals. The methods disclosed herein are not performed solely in the human mind.

DESCRIPTION OF THE DRAWINGS

The disclosure refers to the following figures, in which.

DETAILED DESCRIPTION

Figure 1:
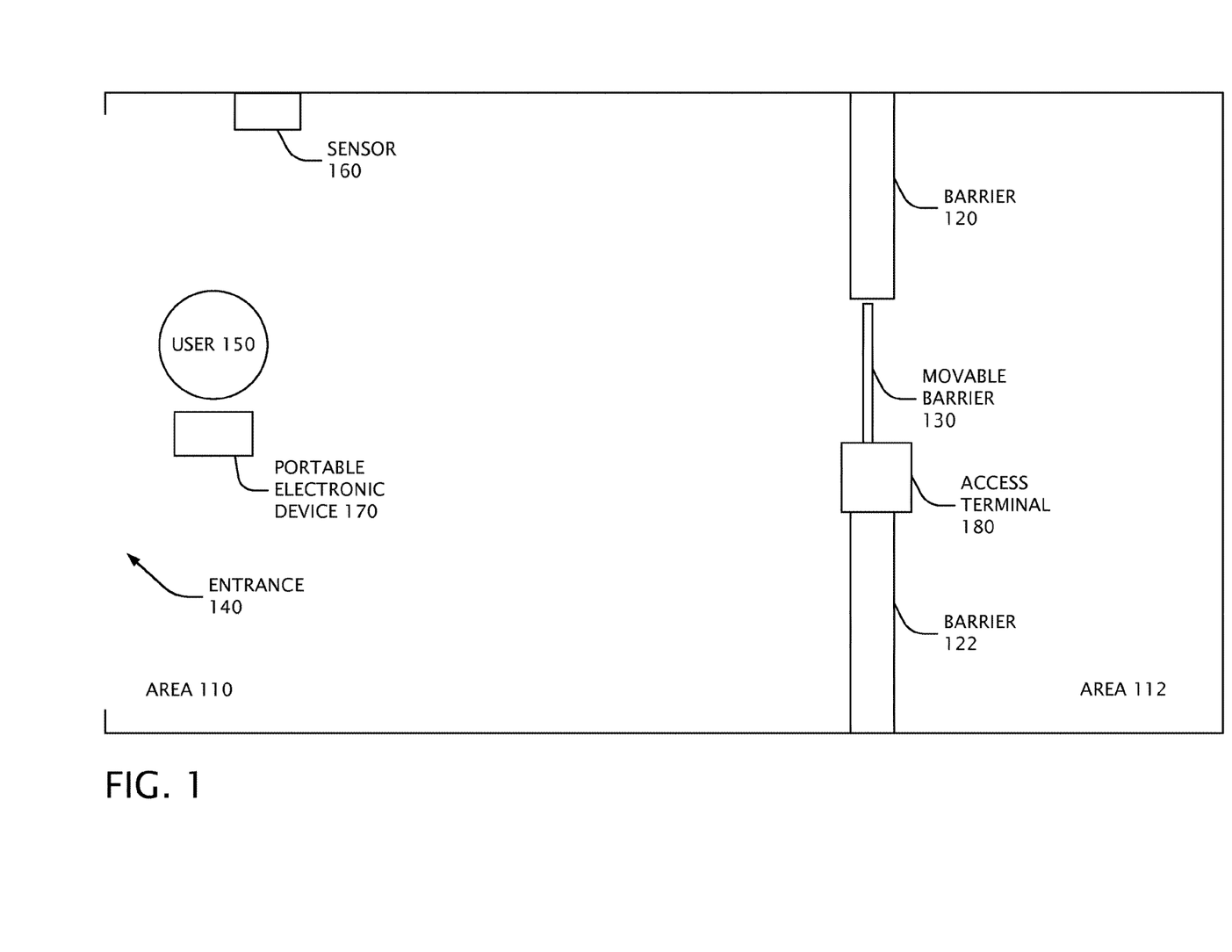
FIG. 1 shows a plan view of an exemplary embodiment of an area using an access control system.

FIG. 1 shows a plan view of an exemplary embodiment of an area using an access control system. One or more of the disclosed technologies can be used in a setting like that of FIG. 1; however, at least some embodiments can also be used in other settings. FIG. 1 shows an area 110 and an area 112. In this case, access to the area 110 is, at least some of the time, generally not regulated by an access control system. One possible example of the area 110 is a building lobby that is generally accessible to the public from an exterior building door. Access to the area 112, on the other hand, is generally regulated by an access control system. The area 112 is thus considered a "secure" area. One possible example is an office area that is intended to be accessible only by employees and their guests. In the particular case shown in FIG. 1, the area 112 is divided from the area 110 by a set of physical barriers 120, 122 and by a movable barrier 130. In other embodiments, physical and movable barriers are not present—instead, one or more boundaries between the areas 110, 112 are electronically monitored. If a boundary or barrier is crossed by an unauthorized party, the access control system does not open a door or barrier, rather the system initiates a countermeasure (e.g., security personnel are notified). Although not shown in FIG. 1, the area 112 can lead to other building areas (e.g., rooms, staircases, elevators, escalators, storage areas, or other places). In at least some cases, the area 110 includes an entrance 140 through which a user 150 can enter or exit the area 110. FIG. 1 also shows a sensor 160 for detecting a portable electronic device 170 carried by the user 150. Although FIG. 1 depicts the sensor 160 as being in the area 110, it can also be located elsewhere (e.g., in the area 112) and configured to detect activity in the area 110. FIG. 1 also shows an access terminal 180, whose functions will be explained in more detail below. Generally, the access terminal 180 is located at or near a boundary between the areas 110, 112.

Figure 2:
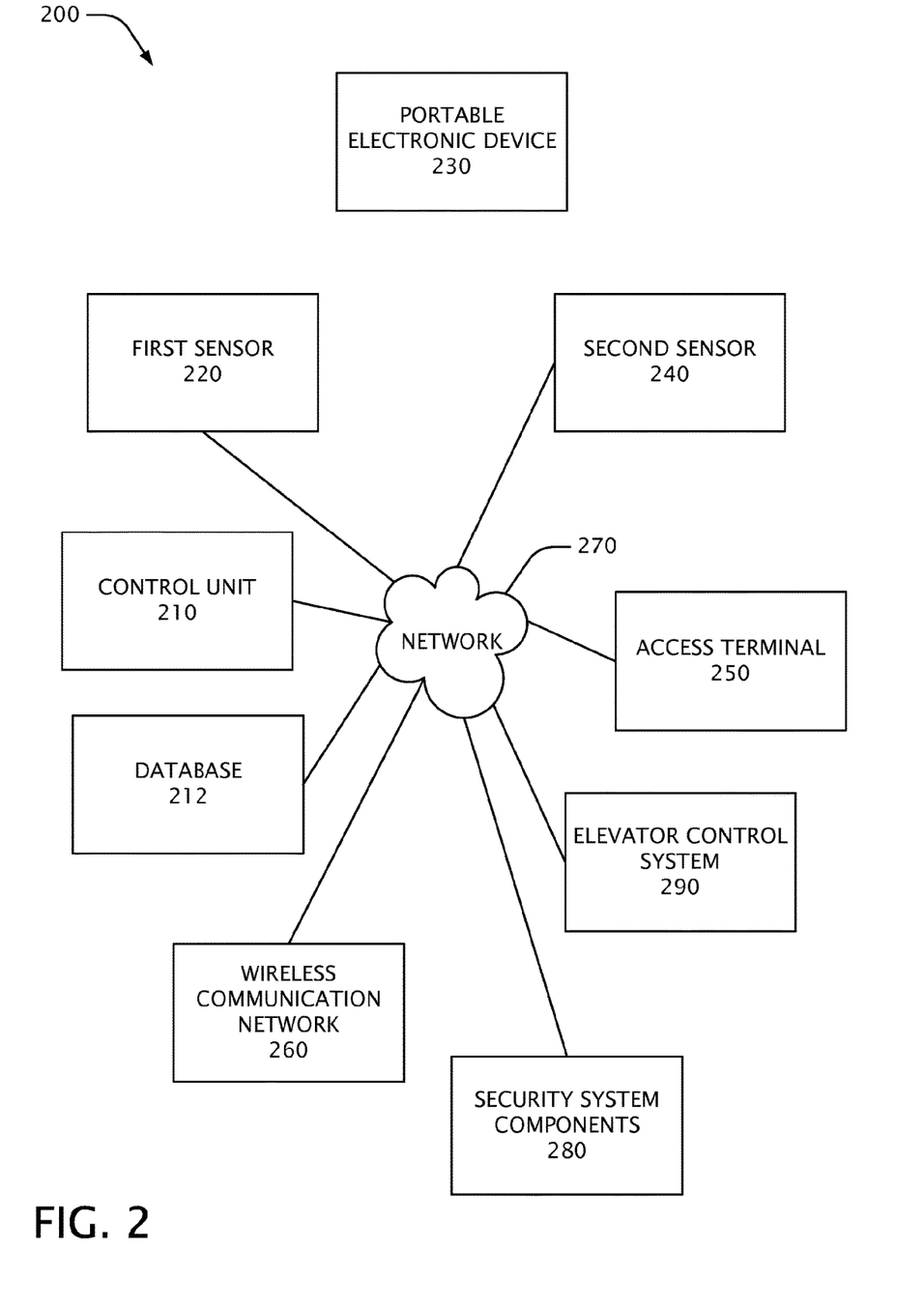
FIG. 2 shows a block diagram of an exemplary embodiment of an access control system.

FIG. 2 shows a block diagram of an exemplary embodiment of an access control system 200. The system 200 includes a computer-based control unit 210. The control unit 210 comprises, for example, a processor configured to perform one or more method acts described in this application. The processor reads corresponding instructions for the method acts from a memory component.

The control unit 210 is coupled to a first sensor 220, which can correspond to the sensor 160 of FIG. 1. The sensor 220 can detect the presence of and communicate with a portable electronic device 230. The portable electronic device 230 is, for example, a smartphone, a mobile telephone, a tablet computer, a smartwatch, or another mobile device. The sensor 220 detects and communicates with the device 230 using a radio-based technology, for example, Bluetooth, Bluetooth LE (Bluetooth low energy), Wi-Fi (wireless network), ZigBee, GPRS (General Packet Radio Service), or another technology. The control unit 210 is also coupled to a second sensor 240, which can likewise detect the present of and communicate with the portable electronic device 230.

In some embodiments, the second sensor 240 is omitted, and only the first sensor 220 is present. In some systems that have both the first and second sensors, both of the sensors 220, 240 can use the same communication technology (e.g., they both use Bluetooth LE). However, in other systems, each of the sensors uses a different communication technology. In embodiments with only one sensor, the sensor can be used to detect the portable electronic device in multiple areas. For example, referring to FIG. 1, a sensor can be configured to detect the portable electronic device both in an area immediately near the access terminal 180 and in an area further from the access terminal 180. For example, the sensor can detect the portable electronic device 170 at the location shown in FIG. 1, and at the access terminal 180. Specifically, the sensor can determine in which of these locations the device 170 is currently located. Monitoring two areas with one sensor can be done using, for example, software or electronics that accordingly control the operation of the sensor.

The control unit 210 is further coupled to an access terminal 250, which can correspond to the access terminal 180 of FIG. 1. In some cases, the sensor 240 and the terminal 250 are integrated into a single unit; in other cases, they are separate components. In particular embodiments, the terminal 250 is a PORT terminal device from the Schindler Group of Switzerland. The control unit 210 is also coupled to a wireless communication network 260 that can communicate with the portable electronic device 230. The wireless communication network 260 comprises, for example: a long-range cellular communication network (e.g., 1G, 2G, 3G, 4G, or another type); a Wi-Fi network; a Bluetooth network; or another type of wireless network. The control unit 210 communicates with the various components of the system 200 through a network 270 (e.g., the internet, a local area network, or another type of network).

In further embodiments, the control unit 210 is also coupled to one or more security system components 280. Such components can include, for example, alarms, cameras, sensors, locks, barriers (e.g., the movable barrier 130), or other components.

In additional embodiments, the control unit 210 is also coupled to an elevator control system 290. The elevator control system 290 can use information provided by the control unit 210 to operate an elevator system. For example, the elevator control system 290 can use such information to place elevator calls, including destination calls.

Figure 3:
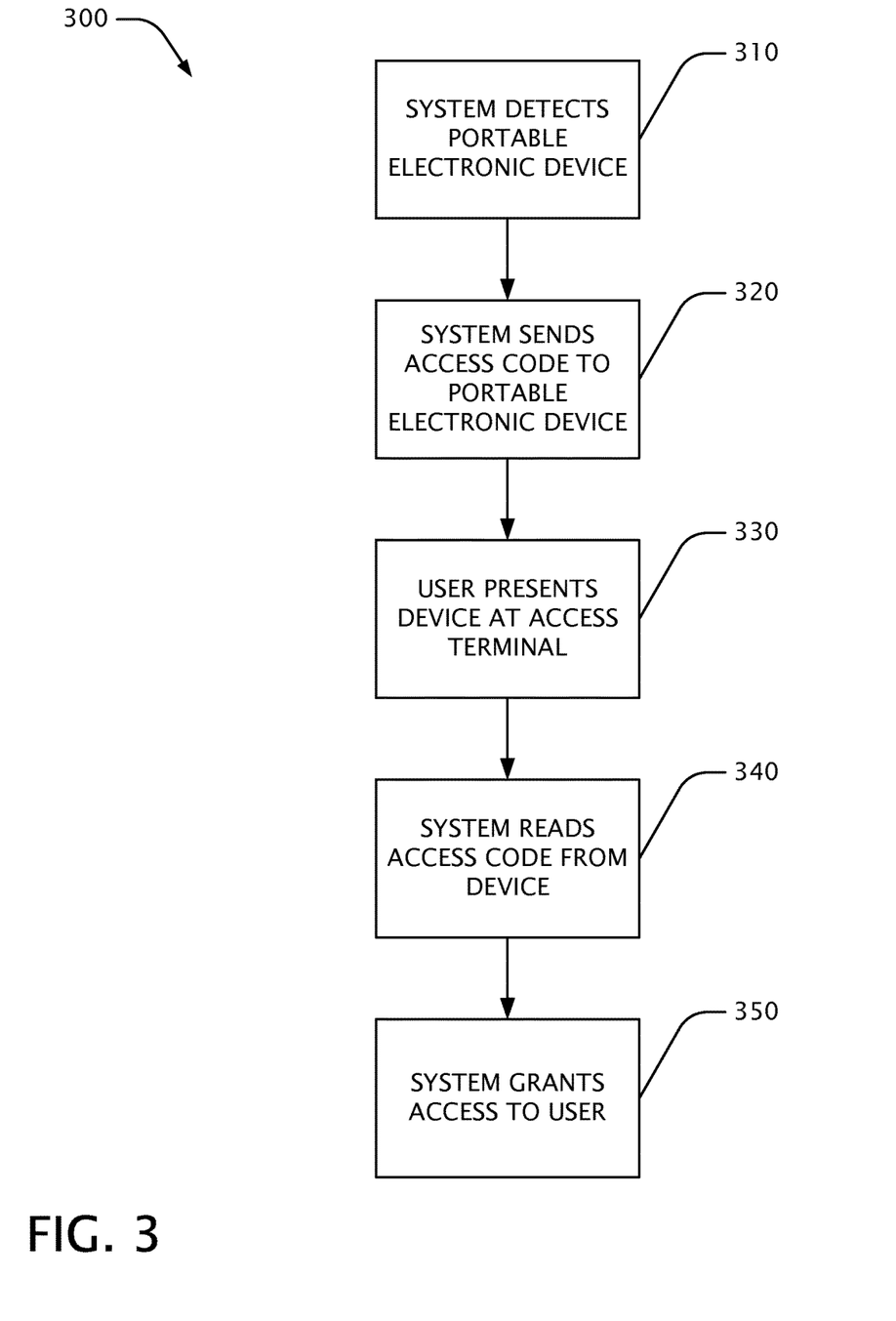
FIG. 3 shows a block diagram of an exemplary embodiment of an access control method.

FIG. 3 shows a block diagram of an exemplary embodiment of an access control method 300. Although the method 300 is described here in the context of the system 200 of FIG. 2, the method 300 can also be used with other system embodiments. In a method act 310, the system 200 detects in a first area (e.g., the area 110) the presence of a portable electronic device, such as the portable electronic device 230. The device is detected using a sensor, such as the first sensor 220. As part of the detection, the sensor determines a first device identifier for the portable electronic device. As used in this application and in the claims, the first device identifier is a piece of information that allows the system to differentiate the portable electronic device from one or more other devices. For example, if the sensor is a Bluetooth or Bluetooth LE sensor, then the sensor can obtain the Bluetooth MAC device address of the portable electronic device and use the address as the first device identifier. In particular embodiments, the first device identifier comprises a unique identifier assigned by the system 200 when the portable electronic device was previously registered with the system 200. Other examples of first device identifiers can include: a MAC (media access control) address for the device; a Wi-Fi address for the device; a token for the device; a telephone number for the device; an IMEI (International Mobile Station Equipment Identity) number for the device; or another piece of information.

In some embodiments, the first device identifier is read directly from the portable electronic device. In other embodiments, the first device identifier is determined based on other information received from the portable electronic device.

In particular embodiments, the portable electronic device periodically broadcasts an identifier, which is referred to herein as an initial identifier. For Bluetooth or Wi-Fi implementations, the initial identifier can be a MAC address. This identifier is received by the access control system using a sensor. In cases where the initial identifier for a device rarely changes or never changes, the initial identifier can be used as the first device identifier. Alternatively, the initial identifier can be used to look up the first device identifier in a database. Thus, the first device identifier is not explicitly read from the device, but is instead passively received from the device (in the form of the initial identifier), or is determined based on information that is passively received from the device.

In further embodiments, the device broadcasts an initial identifier, which is often changed. In such embodiments, the access control system can recognize the presence of the device upon passively receiving the initial identifier. The system can then use the initial identifier to create a connection with the device, through which the system then reads the first device identifier from the device. Possibly, this reading is done using an access control software program running on the device.

In additional embodiments, the device broadcasts an identifier, which occasionally changes. Upon passively receiving the initial identifier, the access control system can determine whether the initial identifier is already known to the system. If the initial identifier is already known, then it can be used as the first device identifier for the device. In such cases, it is not necessary for the system to read a first device identifier from the device. If the initial identifier is not known to the system (perhaps because the initial identifier recently changed), the system can create a connection with the device and read the first device identifier from the device. In future connections with this device, the system can then use the initial identifier as the first device identifier.

Using a passively received, initial identifier can be useful in situations where the sensor can maintain only a limited number of simultaneous, active connections with devices within its sensing area.

Based on the first device identifier, the system can consult a database (e.g., the database 212) and determine whether the device is associated with a user who is known to the system and authorized to use the system. If the device is associated with a known, authorized user, then in a method act 320 the access control system sends an access code to the portable electronic device. Depending on the embodiment, the access code is generated by the database 212, by a server coupled to the system 200 (e.g., a web server, a security server), or by another device. The system sends the access code to the portable electronic device based on a second device identifier, which can be obtained through the database. The second device identifier is another piece of information that allows the system to differentiate the portable electronic device from one or more other devices. It also allows the system to address information to the device. In some embodiments, the second device identifier is a globally unique identifier. Depending on the particular technologies used, the second device identifier can comprise, for example: a Bluetooth device address; an e-mail address for an e-mail account that can be accessed through the portable electronic device; a telephone number associated with the device; an address for a push-notification service; or another piece of information. In at least some cases, the second device identifier is a global identifier for a communication system that is external to the access control system.

Using the second device identifier, the access code is sent through a wireless communication network, such as the network 260 of FIG. 2. In various embodiments, the access code comprises, for example: a number; a character string; an image; a set of images (possibly including time-varying images, such as a film); or an optical code. The access code can be sent to the portable electronic device as user information. User information can comprise, for example, a text message (SMS), a push notification, an e-mail message, or a message sent using another messaging technology. The access code is stored by an access control program that is running on the device. In some cases, a message notification is generated by the program to tell the user that the device has received the access code, or that the user can authenticate to or "unlock" the device (the concept of unlocking a device is explained below). The program can run as part of an operating system for the device, or as a separate application (e.g., a mobile telephone "app").

In some cases, the first device identifier is for a first communications channel, and the second device identifier is for a second communications channel. In this application and in the claims, "communications channel" refers to a technology or means for transmitting information between two components, for example, between the access control system and the portable electronic device. Possible examples of a communication channel can include: a Bluetooth or Bluetooth LE connection; a Wi-Fi connection; a cellular telephone connection; a connection for a push-messaging system; or another type of connection. In some embodiments, the first and second communications channels are the same channel or the same type of channel. For example, each is a Bluetooth or Bluetooth LE connection between the portable electronic device and a sensor of the access control system. In other embodiments, the first and second channels are different types of communication channels. In one example, the first communications channel is a Bluetooth or Bluetooth LE connection between the portable electronic device and a sensor of the access control system; the second communications channel is a cellular telephone connection between the portable electronic device and the wireless communications network.

In a method act 330, the user presents the device at an access terminal, such as the terminal 250, in a second area (e.g., the area 112).

In a method act 340, the sensor in or near the terminal (e.g., the second sensor 240) senses the portable electronic device. The sensor reads the access code from the portable electronic device. The sensor can also read additional data from the device, for example: a digital certificate; the first device identifier; the Wi-Fi address for the device; the MAC address for the device; user identification information; history information for the device or for the user (e.g., where else the device has been, when the device was last at this location); or other information. In particular embodiments, the sensor reads this information by communicating with the access control program that is running on the device.

If the access code read from the device matches the code that was previously sent to the device, then the user is granted access by the system in a method act 350.

In some embodiments, when the system reads the first device identifier from the portable electronic device in the method act 310, the device is in a "locked" state. The device is also in a locked state when the system sends the access code to the device in the method act 320. When the user presents the device to the terminal in the method act 330, the device is in an "unlocked" state. In this application and in the claims, the device is "locked" in the sense that at least some functionality of the device or some information stored in the device is unavailable unless the user "unlocks" the device by authenticating to the device. For example, with some smartphones a user must type in a PIN or input other information into the phone to access programs or data stored on the phone. Other devices can be unlocked using biometric data (e.g., a fingerprint), a gesture on a touch-sensitive area, or a combination of input types. In particular embodiments, the terminal can determine that the mobile electronic device is in an unlocked state based on information received from an app running on the device. For example, the app can indicate that the user is currently using the app. In further embodiments, whether the device is locked or unlocked is irrelevant to the operation of the technology.

Figure 4:
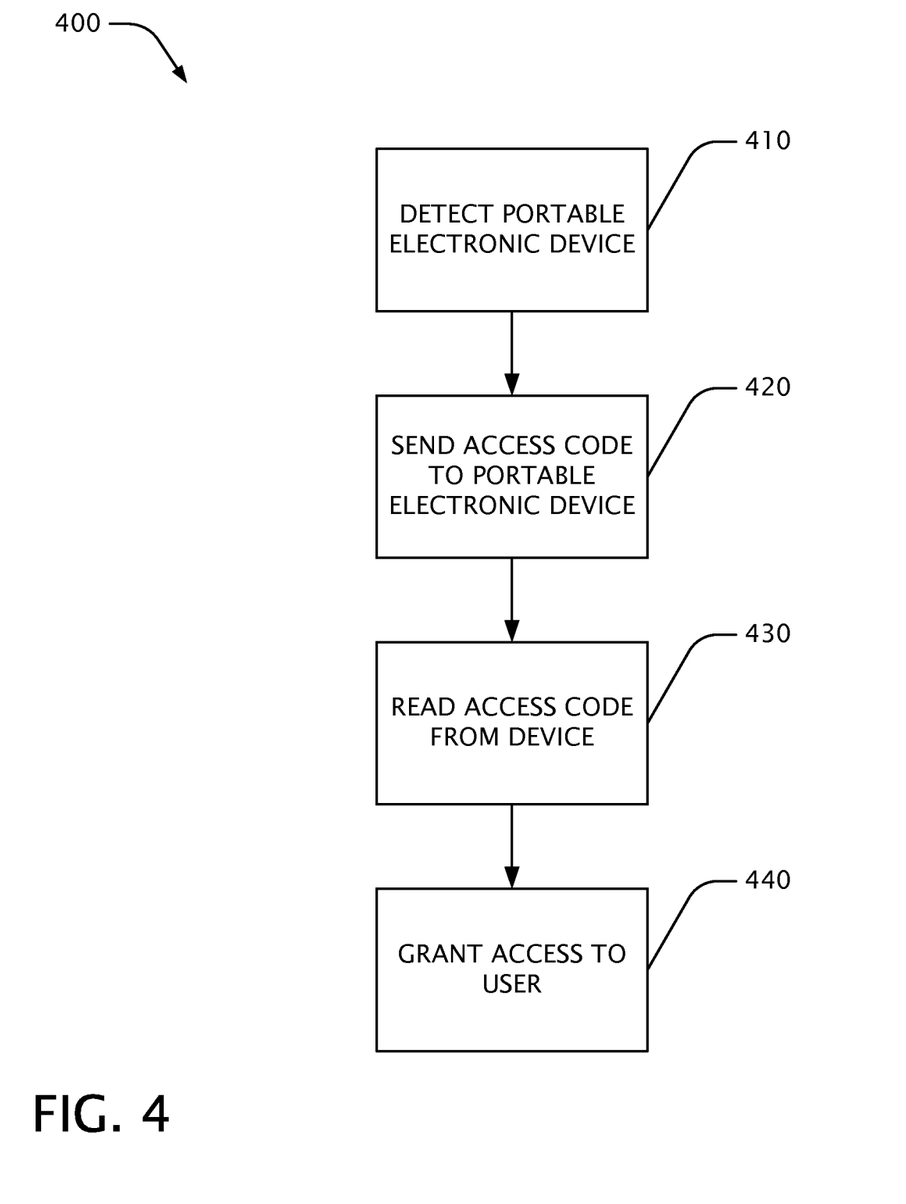
FIG. 4 shows a block diagram of another exemplary embodiment of an access control method.

FIG. 3 provides an example of an "overview" of a particular embodiment of the disclosed technologies. FIG. 4, on the other hand, shows a block diagram of an exemplary embodiment of an access control method 400 that is performed by an access control system, such as the system 200 of FIG. 2. In a method act 410, the system detects a portable electronic device using a first sensor, such as the first sensor 220. As part of the detection, the sensor determines a first device identifier for the portable electronic device.

Similar to the method 300, based on the first identifier, the system can consult a database to determine whether the device is associated with a user who is known to the system and authorized to use the system. If the device is associated with a known, authorized user, then in a method act 420 the access control system sends an access code to the portable electronic device. The system sends the access code to the portable electronic device based on a second device identifier, which can be obtained through the database. In a method act 430, the system uses a second sensor to read the access code from the portable electronic device. The second sensor can be in or near an access terminal. If the access code read from the device matches the code that was previously sent to the device, then the user is granted access by the system in a method act 440.

In some embodiments of the method 400, the portable electronic device is in a locked state during the method acts 410 and 420; during the method act 430, the portable electronic device is in an unlocked state, the device having been unlocked by the user before the user presents the device to the access terminal.

Figure 5:
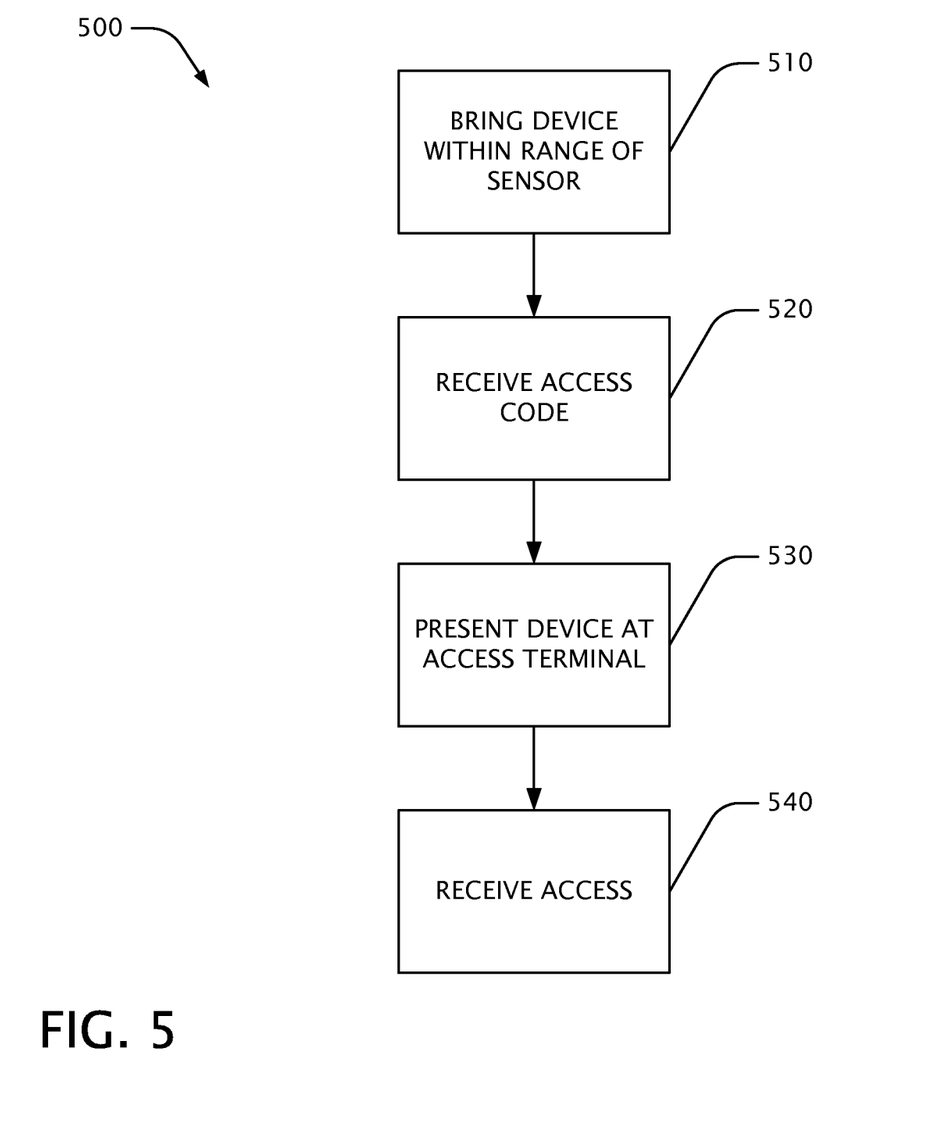
FIG. 5 shows a block diagram of another exemplary embodiment of an access control method.

FIG. 5 shows a block diagram of another exemplary embodiment of an access control method, the method 500. The method 500 is performed by a user of a portable electronic device. In a method act 510, the user brings the portable electronic device within range of a sensor in a first area. By way of example, the first area could be a building lobby, a hallway, or other area. When the device is within range of the sensor, the sensor can determine a first device identifier for the device.

In a method act 520, the user receives an access code using the portable electronic device. In some embodiments, an access control software program running on the device notifies the user that the access code has been received. The notification can comprise, for example: a visual indicator on a display of the device (e.g., "ACCESS CODE HAS BEEN RECEIVED", an icon, or another visual indicator); a vibration indicator; an audio indicator; or another indicator, including a combination of several indicator types. In some embodiments, the notification indicates that the device should be unlocked.

In a method act 530, the user presents the device at an access terminal. The access terminal reads the access code from the device. In a method act 540 the user is granted access by the system (e.g., access to a secure area).

Figure 6:
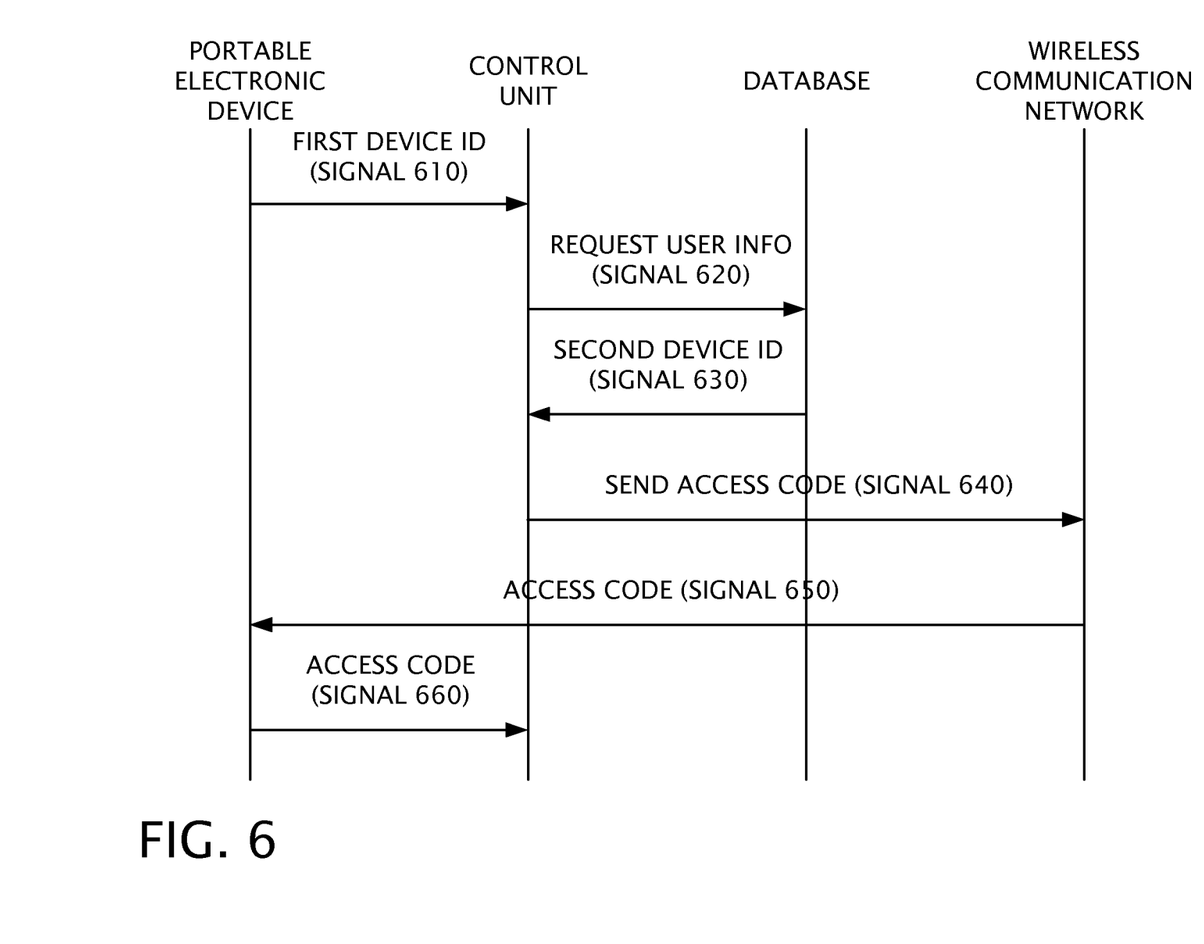
FIG. 6 is a signal diagram showing an exemplary exchange of signals among different components, including components of an access control system.

FIG. 6 is a signal diagram showing an exemplary exchange of signals among different components, including components of an access control system. The system can be, for example, a version of the system 200, or it can be another system. In the example of FIG. 6, a first device identifier is sent by a user's portable electronic device and received by an access system control unit (signal 610). This information travels to the control unit through a sensor, such as the sensor 220. After receiving the first device identifier, the control unit sends the first device identifier to a database (signal 620). Among other possible information, the control unit can receive a second device identifier from the database (signal 630). Based on the second device identifier, the control unit determines an access code and instructs the wireless communication network to send the access code to the portable electronic device (signal 640). The wireless communication network then sends the access code to the portable electronic device (signal 650). The portable electronic device transmits the access code to the control unit through a sensor, such as the sensor 240 (signal 660). After confirming that the access code is valid, the control unit grants access to the user (signal not shown).

In particular embodiments, the access code is generated by a web server (not shown in FIG. 6). The web server sends the access code to the database, the control unit, and the portable electronic device. In further embodiments, the access code is generated by the database, which then sends the access code to the control unit and to the portable electronic device. The access code can also be generated by the control unit.

For clarity, FIG. 6 shows a high-level representation of signals exchanged between different components. Accordingly, FIG. 6 does not display all possible signals that might be exchanged between the components shown. For example, handshake protocols between the portable electronic device and other components, such as the wireless communication network, are not shown in detail.

In any of the disclosed embodiments, the validity of the access code can be limited to a certain amount of time after the code is sent to the portable electronic device (e.g., 1 minute, 2 minutes, 5 minutes, 10 minutes), limited to a certain time period (e.g., Wednesday between 9 AM and 10 AM), or to a certain number of uses (e.g., the access code can be used only once, twice, five time, ten times, or another number of times).

In some cases, the validity time of the access code is based on a distance between the first area and the second area. For example, if the first and second areas are close together, the validity time is shorter than for a system where the two areas are far apart. In other cases, the validity time is based on an expected travel time for the user between the first area and the second area. The expected travel time can be personalized for different users. For example, users who move slowly, perhaps due to age or handicap, can be allotted more time to travel from the first area to the second area.

At least some versions of the disclosed technologies can be used in settings where various areas within a region have different security levels or requirements. For example, in one embodiment, a user is granted access to a secure area by presenting to an access terminal a portable electronic device on which a corresponding access code is stored, the user having previously unlocked the device. The validity of the access code is limited to a certain amount of time after the code is sent to the device (e.g., 1 minute, 2 minutes, 5 minutes, 10 minutes, a half day, a day, or another amount of time).

In a further embodiment, a user is granted access to a secure area by presenting to an access terminal a portable electronic device on which an access code is stored. Access can be granted even if the user has not unlocked the device. Although the access code may be valid for a limited amount of time, the time limit may be a relatively long period (e.g., an hour, half a day, a day, several days, or another amount of time). This embodiment can allow a user to enter a secure area (as well as move between different secure areas) by simply bringing the portable electronic device within range of the access terminal. The user does not need to unlock the device to receive access to the secure area. This can be more convenient for the user than an embodiment that requires unlocking the device every time that the user wishes to receive access to another area. This embodiment can be combined with an embodiment that initially requires presenting an unlocked device with the access code, after which the presentation of a locked device with the access code is sufficient. Presentation of the unlocked device may be sufficient for obtaining access only within a specific area (e.g., within a particular floor of a building). After a selected time period (e.g., a half day, a day, or another time period), the access control system may require the user to again present an unlocked portable electronic device to an access terminal, even if the user has not left the specific area.

In a particular embodiment, a user is granted access to a secure area after unlocking a portable electronic device and presenting the device to an access terminal. The access code is stored on the device, and so the user is granted access to the secure area. Thus, to gain access to the secure area, the user needs to be in possession of the portable electronic device (with the access code) and needs to unlock the device. However, within the secure area, the user is granted access to additional secure areas based solely on one or more characteristics of the device. In other words, to gain access to the additional secure areas, the user does not need to unlock the device. Instead, the access control system obtains an identifier from the device (e.g., a MAC address, a Wi-Fi address, an IMEI number, a token, a telephone number, or another piece of information) and grants access based on this identifier. This arrangement can provide for a somewhat lower level of secure access control with the secure area, while improving convenience for the user within the secure area.

Figure 7:
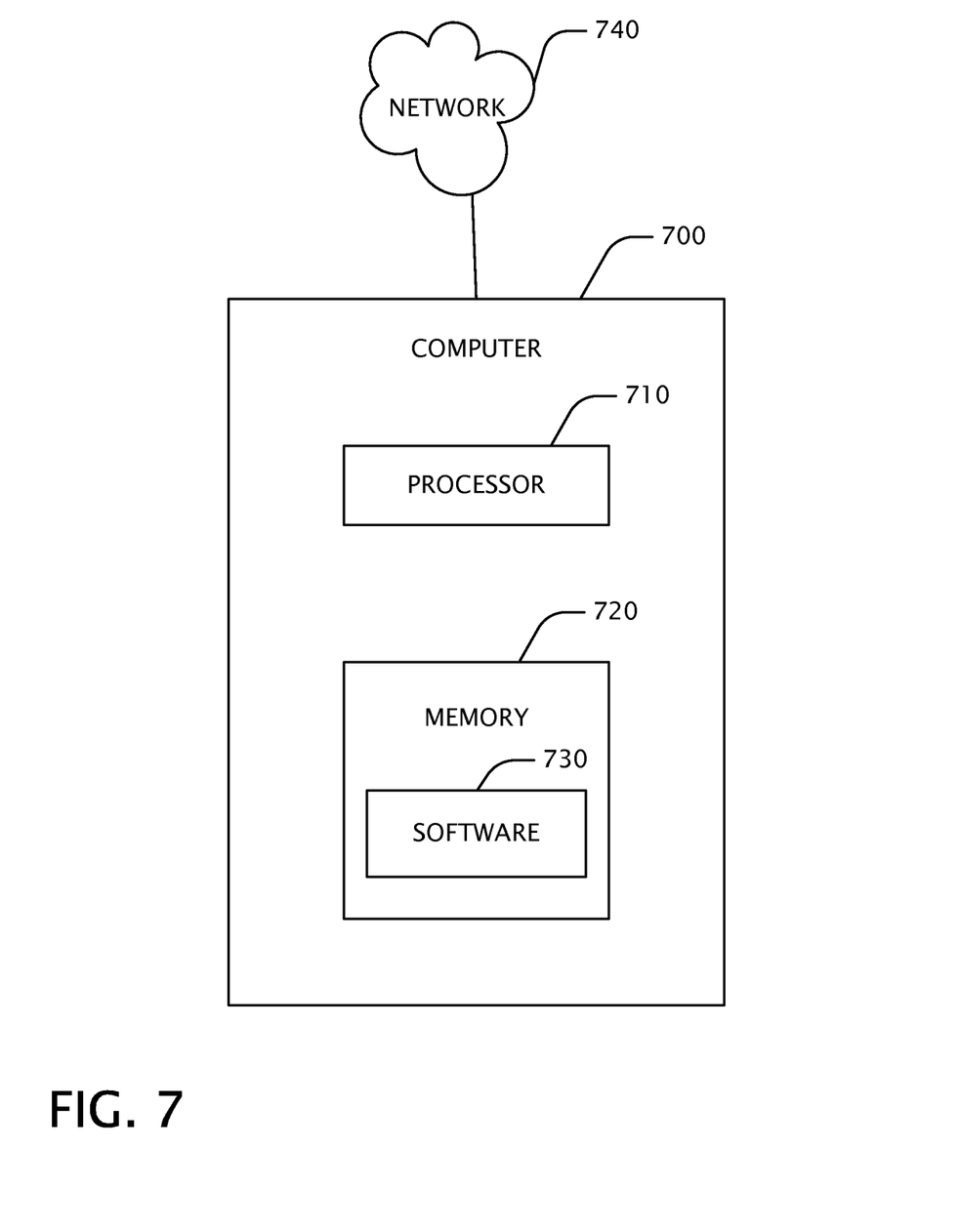
FIG. 7 shows a block diagram of an exemplary embodiment of a computer.

FIG. 7 shows a block diagram of an exemplary embodiment of a computer 700 (e.g., part of an access control system control unit, part of a portable electronic device, part of an access terminal, part of an elevator control unit, part of a database, part of a wireless communication network) that can be used with one or more technologies disclosed herein. The computer 700 comprises one or more processors 710. The processor 710 is coupled to a memory 720, which comprises one or more computer-readable storage media storing software instructions 730. When executed by the processor 710, the software instructions 730 cause the processor 710 to perform one or more of the method acts disclosed herein. Further embodiments of the computer 700 can comprise one or more additional components. The computer 700 can be connected to one or more other computers or electronic devices through an input/output component (not shown). In at least some embodiments, the computer 700 can connect to other computers or electronic devices through a network 740. In particular embodiments, the computer 700 works with one or more other computers, which are located locally, remotely, or both. One or more of the disclosed methods can thus be performed using a distributed computing system.

At least some of the disclosed embodiments can provide more convenient and user-friendly access control. For example, to access a secure area, a user does not need to carry a token besides the portable electronic device, which can be something that the user keeps with him or her for additional purposes, such as a smartphone. Also, during operation of the system the user does not need to manually input or even know the access code.

At least some of the disclosed embodiments can provide increased security compared to single-factor-authentication methods where, for example, only a token or only a password is required. Embodiments requiring a user to be in possession of a portable electronic device and to be able to unlock the device can serve as multiple-factor-authentication methods.

Particular disclosed embodiments can provide increased security by using different types of first and second communications channels. Any combination of technologies can be used for the communications channels. For example, the first device identifier can be read from a portable electronic device using a Bluetooth or Bluetooth LE connection, while the access code is sent to the device using a telephone connection (e.g., as a text message). If the Bluetooth or Bluetooth LE device address has been faked by a third party (e.g., to make it appear that the third party's device is the user's device), the access system will still send the access code to the user's device over through the second communication channel. The user's device will receive the access code, even though the user's device was not near a sensor of the access control system. The user can then recognize that the third party is attempting to emulate the user's device.

In one non-limiting example, a user enters a building and walks into the lobby carrying a smartphone. Through a sensor, an access control system detects that the smartphone has entered the lobby, and that a particular access control software program is running on the smartphone. The smartphone is in a locked state. The access control system determines a first device identifier for the smartphone, which in this case is a Bluetooth device address or a universal identifier (UID). The access system uses the first device identifier to determine whether, according to a database, the device belongs to an authorized user. After determining that the device does belong to an authorized user, the access system retrieves, from the database, a second device identifier for the smartphone. In this case, the second device identifier is a push notification address. Using the push notification address, the access control system instructs a wireless communication network (in this case, the cellular telephone network) to send an access code to the smartphone in a push notification. The smartphone receives the push notification. As a result, the software program running on the smartphone displays a notification that the smartphone has received the access code. The user moves through the lobby and approaches an access control terminal located at a barrier in the lobby. The user unlocks the smartphone by typing a PIN into the phone. The user holds the smartphone near the access control terminal. A Bluetooth sensor in the terminal detects the smartphone, determines that the smartphone is in an unlocked state, and communicates with the software program to read the access code from the smartphone. The sensor also reads a digital certificate from the smartphone. The access control system confirms that the access code read from the smartphone is the same code that the system previously sent using the push notification, and that the access code corresponds to the digital certificate. The access control system then opens the lobby barrier to grant the user access to a secured area.

Although some embodiments of the various methods disclosed herein are described as comprising a certain number of method acts, further embodiments of a given method can comprise more or fewer method acts than are explicitly disclosed herein. In additional embodiments, method acts are performed in an order other than as disclosed herein. In some cases, two or more method acts can be combined into one method act. In some cases, one method act can be divided into two or more method acts.

Although many of the disclosed access system embodiments are generally described as controlling access to a physical area, any of the embodiments can be adapted to control access to information (e.g., information stored on a computer).

Unless stated otherwise, a phrase referring to "at least one of" a list of items refers to any combination of those items, including single members. As an example, "at least one of: a, b, or c" is intended to cover: a; b; c; a and b; a and c; b and c; and a, b and c. As another example, "at least one of: a, b, and c" is intended to cover: a; b; c; a and b; a and c; b and c; and a, b and c.

As used herein, a "user" can be a person, a group of persons, a machine, an object, or an animal.

Having illustrated and described the principles of the disclosed technologies, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only examples of the technologies and should not be taken as limiting the scope of the invention.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method of access control comprising the steps of:
determining a first device identifier for a portable electronic device of a user, the determining being performed in response to the portable electronic device entering a first area and being detected by an access control system, wherein the first device identifier is used by the portable electronic device to communicate over a first communications channel;
as a result of determining the first device identifier from the portable electronic device,
determining whether, according to a database of the access control system, the portable electronic device belongs to an authorized user,
when the portable electronic device belongs to an authorized user, retrieving by the access control system, from the database, a second device identifier for the portable electronic device, wherein the second device identifier is used by the portable electronic device to communicate over a second communications channel, and
sending, by the access control system, an access code to the portable electronic device via the second communication channel used by the second device identifier for the portable electronic device, the second device identifier being different from the first device identifier and having been determined based on the first device identifier;
reading the access code from the portable electronic device at a second area using an access terminal of the access control system; and
granting access to the second area to the user as a result of reading the access code from the portable electronic device when the access control system confirms that the access code read from the portable electronic device is the same as the access code that the access control system sent via the second communications channel.

2. The method according to claim 1 wherein the portable electronic device is in a locked state when the first device identifier is determined and when the access code is sent to the portable electronic device, and the portable electronic device is in an unlocked state when the access code is read from the portable electronic device using the access terminal.

3. The method according to claim 2 wherein the second area has a designated security level, the method further comprising the steps of:
reading the access code from the portable electronic device at a third area using another access terminal while the portable electronic device is in the locked state, the third area having a lower designated security level than the second area and being within the second area; and granting the user access to the third area based on the access code read by the another access terminal.

4. The method according to claim 1 wherein the second device identifier comprises a global identifier for a communication system, the communication system being external to an access control system.

5. The method according to claim 1 wherein sending the access code to the portable electronic device comprises sending user information to the portable electronic device.

6. The method according to claim 1 wherein the first device identifier is obtained using a radio signal from the portable electronic device, or the access code is read from the portable electronic device using a radio signal from the portable electronic device.

7. The method according to claim 1 wherein the access code has a limited validity time.

8. The method according to claim 7 wherein the validity time of the access code is based on at least one of an expected travel time for the user from the first area to the second area, on a distance between the first area and the second area, and on a security level for one of the first area and the second area.

9. The method according to claim 1 further comprising determining, using the access terminal, that an access control program is running on the portable electronic device.

10. The method according to claim 1 wherein the determining the first device identifier comprises receiving, using a sensor, a periodically transmitted device identifier from the portable electronic device.

11. The method according to claim 10 wherein the first device identifier is determined to be the periodically transmitted device identifier, or wherein the periodically transmitted device identifier is used to create a communication connection with the portable electronic device, the first device identifier being read from the portable electronic device through the communication connection.

12. The method according to claim 11 further comprising determining if the periodically transmitted device identifier is a known periodically transmitted device identifier.

13. A system for access control comprising:
a sensor;
an access terminal;
a wireless communication network;
a database; and
a computer-based control unit connected to the sensor, the access terminal, the wireless communication network, and the database, the control unit comprising a processor and a computer-readable storage medium, the computer-readable storage medium comprising instructions that cause the processor to,
determine a first device identifier for a portable electronic device of a user using the sensor, the determining being performed in response to the portable electronic device entering a first area and being detected by the control unit, wherein the first device identifier is used by the portable electronic device to communicate over a first communications channel,
as a result of determining the first device identifier from the portable electronic device,
determine whether, according to the database, the portable electronic device belongs to an authorized user,
when the portable electronic device belongs to an authorized user, retrieve by the control unit, from the database, a second device identifier for the portable electronic device, wherein the second device identifier is used by the portable electronic device to communicate over a second communications channel, and
send, by the control unit, an access code to the portable electronic device via the second communication channel used by the second device identifier for the portable electronic device, the second device identifier being different from the first device identifier and having been determined based on the first device identifier,
read the access code from the portable electronic device using the access terminal, the access terminal being in a second area, and
grant access to the second area to the user as a result of reading the access code from the portable electronic device when the control unit confirms that the access code read from the portable electronic device is the same as the access code that the control unit sent via the second communications channel.

14. A non-transitory computer-readable storage medium having encoded thereon instructions that, when executed by a processor, cause the processor to perform a method, the method comprising the steps of:
determining a first device identifier for a portable electronic device of a user, the determining being performed in response to the portable electronic device entering a first area and being detected by an access control system, wherein the first device identifier is used by the portable electronic device to communicate over a first communications channel;
as a result of determining the first device identifier for the portable electronic device,
determining whether, according to a database of the access control system, the portable electronic device belongs to an authorized user,
when the portable electronic device belongs to an authorized user, retrieving by the access control system, from the database, a second device identifier for the portable electronic device, wherein the second device identifier is used by the portable electronic device to communicate over a second communications channel, and
sending an access code to the portable electronic device via the second communication channel used by the second device identifier for the portable electronic device, the second device identifier being different from the first device identifier and having been determined based on the first device identifier;
reading the access code from the portable electronic device at a second area using an access terminal of the access control system; and
granting access to the second area to the user as a result of reading the access code from the portable electronic device when the access control system confirms that the access code read from the portable electronic device is the same as the access code that the access control system sent via the second communications channel.

* * * * *